(12) United States Patent
Ji et al.

(10) Patent No.: US 8,406,324 B2
(45) Date of Patent: Mar. 26, 2013

(54) DIGITAL TRANSMISSION AND RECEPTION DEVICES FOR TRANSMITTING AND RECEIVING STREAMS, AND PROCESSING METHODS THEREOF

(75) Inventors: Kum-Ran Ji, Seoul (KR); Jung-Pil Yu, Suwon-si (KR); Chan-Sub Park, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 12/599,558

(22) PCT Filed: May 15, 2008

(86) PCT No.: PCT/KR2008/002722
§ 371 (c)(1),
(2), (4) Date: Nov. 10, 2009

(87) PCT Pub. No.: WO2008/140276
PCT Pub. Date: Nov. 20, 2008

(65) Prior Publication Data
US 2010/0316143 A1    Dec. 16, 2010

Related U.S. Application Data

(60) Provisional application No. 60/938,055, filed on May 15, 2007.

(30) Foreign Application Priority Data

May 15, 2008    (KR) .................... 10-2008-0044951

(51) Int. Cl.
*H04K 1/10*    (2006.01)

(52) U.S. Cl. ........................................ 375/260; 375/265
(58) Field of Classification Search ............. 375/259, 375/260, 265
See application file for complete search history.

(56) References Cited

U.S. PATENT DOCUMENTS

| 6,668,022 | B1 * | 12/2003 | Kim ..................... 375/240.27 |
| 7,030,935 | B2 | 4/2006 | Choi et al. |
| 2002/0036718 | A1 | 3/2002 | Lee |
| 2006/0143677 | A1 | 6/2006 | Weiss |
| 2007/0033475 | A1 | 2/2007 | Park et al. |

(Continued)

FOREIGN PATENT DOCUMENTS

| JP | 2000-013761 | 1/2000 |
| KR | 2002-66260 | 8/2002 |
| WO | WO 2006/001635 | 1/2006 |

OTHER PUBLICATIONS

Communication dated May 3, 2012 issued by the Canadian Intellectual Property Office in counterpart Canadian Patent Application No. 2,684,387.

(Continued)

*Primary Examiner* — Emmanuel Bayard
(74) *Attorney, Agent, or Firm* — Sughrue Mion, PLLC

(57) ABSTRACT

A transmission system to transmit a transport stream (TS) having normal data and additional data, the transmission system including: a stream constructor to generate a TS, and a multiplexer (MUX) to insert information representing the characteristics of additional data in the TS. Therefore, it is possible for a reception system to use the additional data efficiently.

35 Claims, 9 Drawing Sheets

U.S. PATENT DOCUMENTS

| | | | |
|---|---|---|---|
| 2007/0040938 A1* | 2/2007 | Choi et al. | 348/470 |
| 2007/0076584 A1 | 4/2007 | Kim et al. | |
| 2007/0253502 A1 | 11/2007 | Park et al. | |
| 2009/0103647 A1 | 4/2009 | Park et al. | |
| 2009/0103657 A1 | 4/2009 | Park et al. | |
| 2009/0103660 A1 | 4/2009 | Park et al. | |
| 2009/0116580 A1 | 5/2009 | Park et al. | |
| 2009/0147889 A1* | 6/2009 | Chang et al. | 375/341 |
| 2010/0195760 A1* | 8/2010 | Weiss | 375/295 |
| 2010/0293588 A1* | 11/2010 | Kim et al. | 725/144 |

OTHER PUBLICATIONS

Communication dated May 10, 2012 issued by the Canadian Intellectual Property Office in counterpart Canadian Patent Application No. 2,681,860.

Written Opinion of the International Searching Authority (PCT/ISA/237) issued in International Patent Application No. PCT/KR2008/002722 on Sep. 11, 2008.

Search Report of the International Searching Authority (PCT/ISA/210) issued in International Patent Application No. PCT/KR2008/002722 on Sep. 16, 2008.

\* cited by examiner

DIGITAL TRANSMISSION AND RECEPTION DEVICES FOR TRANSMITTING AND RECEIVING STREAMS, AND PROCESSING METHODS THEREOF

CROSS-REFERENCE TO RELATED APPLICATIONS

This application is a national stage application of PCT International Patent Application No. PCT/KR2008/002722, filed May 15, 2008, and claims the benefit of Korean Patent Application No. 10-2008-0044951, filed May 15, 2008 in the Korean Intellectual Property Office, and U.S. Provisional Application No. 60/938,055, filed May 15, 2007 in the U.S. Patent and Trademark Office, the disclosures of which are incorporated herein by reference.

BACKGROUND OF THE INVENTION

1. Field of the Invention

Aspects of the present invention relate to a digital transmission device, a digital reception device, and processing methods thereof, and more particularly, to a transmission system and a reception system capable of identifying a transmission mode or a reception mode using mode information, and a method for processing a stream using the same.

2. Description of the Related Art

Since the development of digital technology, there have been efforts of shifting from an analog broadcast system to a digital broadcast system. Accordingly, many countries have suggested diverse digital broadcast standards. Among them, the Advanced Television System Committee (ATSC) standard and the Digital Video Broadcasting-Terrestrial (DVB-T) standard are commonly used.

The ATSC standard adopts an 8-Vestigial Side Band (VSB) scheme, and the DVB-T standard adopts a Coded Orthogonal Frequency Division Multiplex (COFDM) scheme. Thus, the DVB-T standard is strong in a multi-path channel (in particular, in channel interference), and can easily implement a single frequency network (SFN). However, since the DVB-T standard has a low data transmission rate, it is difficult to implement a high definition broadcast therefor. In contrast, the ATSC standard can easily implement a high definition broadcast. Since each standard has advantages and disadvantages, each country is trying to compensate for the disadvantages and suggest an optimized standard.

As portable devices have become widely distributed, efforts to view a digital broadcast using a portable device are being made. Due to frequent mobility of a portable device, streams used for the portable device must be processed more robustly than normal streams. Therefore, a technology for efficiently transmitting additional streams using existing digital facilities is being developed.

In greater detail, a robustly processed stream additionally inserted into a normal stream that is transmitted to general broadcast reception devices is being developed, such that a portable device receives and process the additional stream. In this case, the additional stream can be inserted in any form and in any place. Therefore, if a reception system is not aware of characteristics on the form and/or place of the additional stream, the reception system can receive, but not process, the additional stream.

SUMMARY OF THE INVENTION

Aspects of the present invention provide a digital transmission device to transmit mode information using a field sync and/or a signaling information channel (SIC) so that a receiving party can efficiently process additional data, a digital reception device, and a method for processing a stream using the same.

According to an aspect of the present invention, there is provided a digital transmission device including: an adapter to form a space for inserting additional data in a transport stream; and a processor to generate the transport stream in which the additional data is inserted into the space, and to insert mode information representing characteristics of the additional data into a field sync and/or a signaling information channel (SIC) of the transport stream.

According to an aspect of the present invention, the processor may include a field sync generator which generates the field sync including the mode information, and a multiplexer (MUX) which multiplexes the generated field sync with the transport stream.

According to an aspect of the present invention, the processors may include a stuffer which inserts the SIC including the mode information and the additional data into the transport stream.

According to an aspect of the present invention, the processors may include a stuffer which inserts the SIC containing the mode information and the additional data into the transport stream, a field sync generator which generates the field sync containing the mode information, and a MUX which multiplexes the generated field sync with the transport stream.

According to an aspect of the present invention, the digital transmission device may further include a supplementary reference signal (SRS) inserter which inserts an SRS into the transport stream.

According to an aspect of the present invention, the mode information may be information used to process the additional data or the SRS, and may include a coding rate, a data rate, an insertion position, a type of a used error correction code, primary service information, an insertion pattern of the SRS, information regarding a size of the SRS, information used to support time slicing, a description of the additional data, information regarding modification of the mode information, and/or information to support an Internet protocol (IP) service.

According to an aspect of the present invention, the mode information included in the field sync may be generated by distributing the mode information representing the characteristics of the additional data in a plurality of field syncs.

According to another aspect of the present invention, there is provided a method for processing a stream by a digital transmission device, the method including: forming a space for inserting additional data in a transport stream; and generating the transport stream in which mode information representing characteristics of the additional data to be inserted into the space is inserted into a field sync and/or a signaling information channel (SIC).

According to an aspect of the present invention, the generating of the transport stream may include generating the field sync including the mode information, and multiplexing the generated field sync with the transport stream.

According to an aspect of the present invention, the generating of the transport stream may include inserting the SIC including the mode information and the additional data into the transport stream.

According to an aspect of the present invention, the generating of the transport stream may include inserting the SIC including the mode information and the additional data into the transport stream, generating the field sync including the mode information, and multiplexing the generated field sync with the transport stream.

According to an aspect of the present invention, the method may further include inserting a supplementary reference signal (SRS) into the transport stream.

According to an aspect of the present invention, the mode information may be information used to process the additional data or the SRS, and may include a coding rate, a data rate, an insertion position, a type of a used error correction code, primary service information, an insertion pattern of the SRS, information regarding a size of the SRS, information used to support time slicing, a description of the additional data, information regarding modification of the mode information, and/or information to support an Internet protocol (IP) service.

According to an aspect of the present invention, the mode information included in the field sync may be generated by distributing the mode information representing the characteristics of the additional data in a plurality of field syncs.

According to another aspect of the present invention, there is provided a digital reception device including: a mode information detector to detect mode information representing characteristics of additional data from a field sync and/or a signaling information channel (SIC) of a received transport stream including normal data and the additional data; and a data processor to process the transport stream using the detected mode information.

According to an aspect of the present invention, the mode information detector may restore the mode information recorded in the field sync by demultiplexing the field sync and performing an operation corresponding to forward error correction (FEC) that a digital transmission device has performed for the mode information.

According to an aspect of the present invention, the data processor may include a synchronizer which synchronizes the transport stream, an equalizer which equalizes the transport stream, an FEC processor which performs forward error correction of the equalized transport stream, and an additional data processor which detects and restores the additional data from the FEC-processed transport stream based on a location identified by the restored mode information.

According to an aspect of the present invention, the data processor may include a synchronizer which synchronizes the transport stream, an equalizer which equalizes the transport stream, and an FEC processor which detects the additional data from the equalized transport stream using the detected mode information, and performs forward error correction of the additional data.

According to an aspect of the present invention, the mode information detector may include an additional data processor which detects and processes the SIC and the additional data from the received transport stream, and detects the mode information from the SIC.

According to an aspect of the present invention, the digital reception device may further include a controller which, if a supplementary reference signal (SRS) is included in the transport stream, detects the SRS from the transport stream based on the restored mode information.

According to an aspect of the present invention, the data processor may include an equalizer which performs channel equalization using the SRS.

According to an aspect of the present invention, the mode information may be information used to process the additional data or the SRS, and may include a coding rate, a data rate, an insertion position, a type of a used error correction code, primary service information, an insertion pattern of the SRS, information regarding a size of the SRS, information used to support time slicing, a description of the additional data, information regarding modification of the mode information, and/or information to support an Internet protocol (IP) service.

According to an aspect of the present invention, the mode information detector may detect the mode information by combining each mode signal area formed in each of a plurality of field syncs.

According to another aspect of the present invention, there is provided a method of processing a stream by a digital reception device, the method including: receiving a transport stream in which normal data and additional data are mixed; detecting mode information representing characteristics of the additional data from a field sync and/or a signaling information channel (SIC) of the transport stream; and processing the transport stream using the detected mode information.

According to an aspect of the present invention, the detecting of the mode information may include demultiplexing the field sync data in the transport stream, performing convolutional (CV) decoding of the detected field sync data, performing Reed Solomon (RS) decoding of the CV-decoded field sync data, and derandomizing the RS-decoded field sync data.

According to an aspect of the present invention, the detecting of the mode information may include demultiplexing the field sync data in the transport stream, derandomizing the demultiplexed field sync data, performing convolutional (CV) decoding of the derandomized field sync data, and performing Reed Solomon (RS) decoding of the CV-decoded field sync data, so that the mode information in the field sync is restored.

According to an aspect of the present invention, the processing of the data may include synchronizing the transport stream, equalizing the synchronized transport stream, performing forward error correction of the equalized transport stream, and detecting and restoring the additional data from the FEC-processed transport stream based on a location identified by the restored mode information.

According to an aspect of the present invention, the detecting of the mode information may include detecting the SIC area from the received transport stream, and detecting the mode information from the SIC area by processing the SIC area.

According to an aspect of the present invention, the method may further include, if a supplementary reference signal (SRS) is included in the transport stream, detecting the SRS from the transport stream based on the restored mode information.

According to an aspect of the present invention, the mode information may be information used to process the additional data or the SRS, and may include a coding rate, a data rate, an insertion position, a type of a used error correction code, primary service information, an insertion pattern of the SRS, information regarding a size of the SRS, information used to support time slicing, a description of the additional data, information regarding modification of the mode information, and/or information to support an Internet protocol (IP) service.

According to an aspect of the present invention, the mode information may be detected by combining each mode signal area formed in each of a plurality of field syncs.

According to aspects of the present invention, mode information representing the characteristics of additional data that is transmitted together with normal data can be efficiently transmitted to a reception device using a field sync and/or a SIC. In addition, a large size of mode information can be transmitted and received by a combination of a plurality of fields. Therefore, the reception device can easily identify the characteristics of the additional data and thus process a proper operation.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
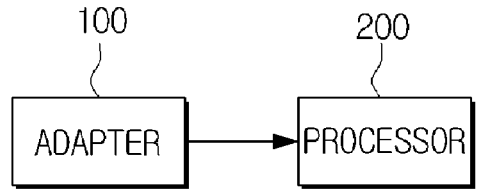
FIG. 1 is a block diagram illustrating a digital transmission device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a digital transmission device according to an embodiment of the present invention. As illustrated in FIG. 1, the digital transmission device includes an adapter 100 and a processor 200. The adapter 100 forms a space to insert additional data into a transport stream to be transmitted to a reception system. The transport stream may be a normal data stream. The normal data stream may be broadcast data that is transmitted and/or received by existing digital broadcast transmission and reception systems. In addition, the additional data represents data that is processed to be stronger in errors than the normal data so that even portable devices on the move can receive and process the additional data, which is also referred to as turbo data.

The processor 200 inserts the additional data into the space formed by the adapter 100. Furthermore, the processor 200 inserts mode information representing characteristics of the additional data into a field sync and/or a Signaling Information Channel (SIC) of the transport stream. If the processor 200 inserts mode information into both the field sync and the SIC, the processor 200 may insert the same mode information or different mode information into the field sync and the SIC.

That is, the additional data may be transmitted in diverse forms according to the size or use. Accordingly, the reception system can identify the characteristics of the additional data and appropriately process the additional data when the reception system is notified of the characteristics of the additional data, such as the insertion position and the size of the additional data. In the present disclosure, information representing such characteristics is referred to as mode information.

In more detail, the mode information is information used to process additional data or a supplementary reference signal (SRS), and may include a coding rate, a data rate, an insertion position, a type of used error correction code, a primary service information, and/or, if a supplementary reference signal is contained in the transport stream, an insertion pattern of the supplementary reference signal, information regarding a size of the supplementary reference signal, information used to support time slicing, a description of the additional data, information regarding modification of the mode information, and/or information to support an Internet protocol (IP) service.

The insertion position of the additional data may be information representing a packet of the transport stream into which the additional data is inserted, or information representing whether the additional data is inserted in a partial field of a packet or in a full packet. In addition, the primary service information refers to information used to receive data to be primarily processed when diverse types of additional data are inserted.

The insertion pattern of the supplementary reference signal is information representing whether the insertion pattern is a distribute pattern in which the supplementary reference signal is evenly distributed and inserted into the transport stream, or a burst pattern in which the supplementary reference signal is concentrated on and inserted into part of the transport stream. More specifically, if the supplementary reference signal is inserted into the transport pattern, the mode information may indicate a period of packets in which the supplementary reference signal is inserted, and the size of the supplementary reference signal (for example, 10 bytes, 15 bytes, 20 bytes, 26 bytes, etc.) as well as the position in which the supplementary reference signal is inserted in a packet.

It is understood that the configuration of the processor 200 and the format of the mode information may be implemented in diverse ways according to various embodiments of the present invention.

Figure 2:
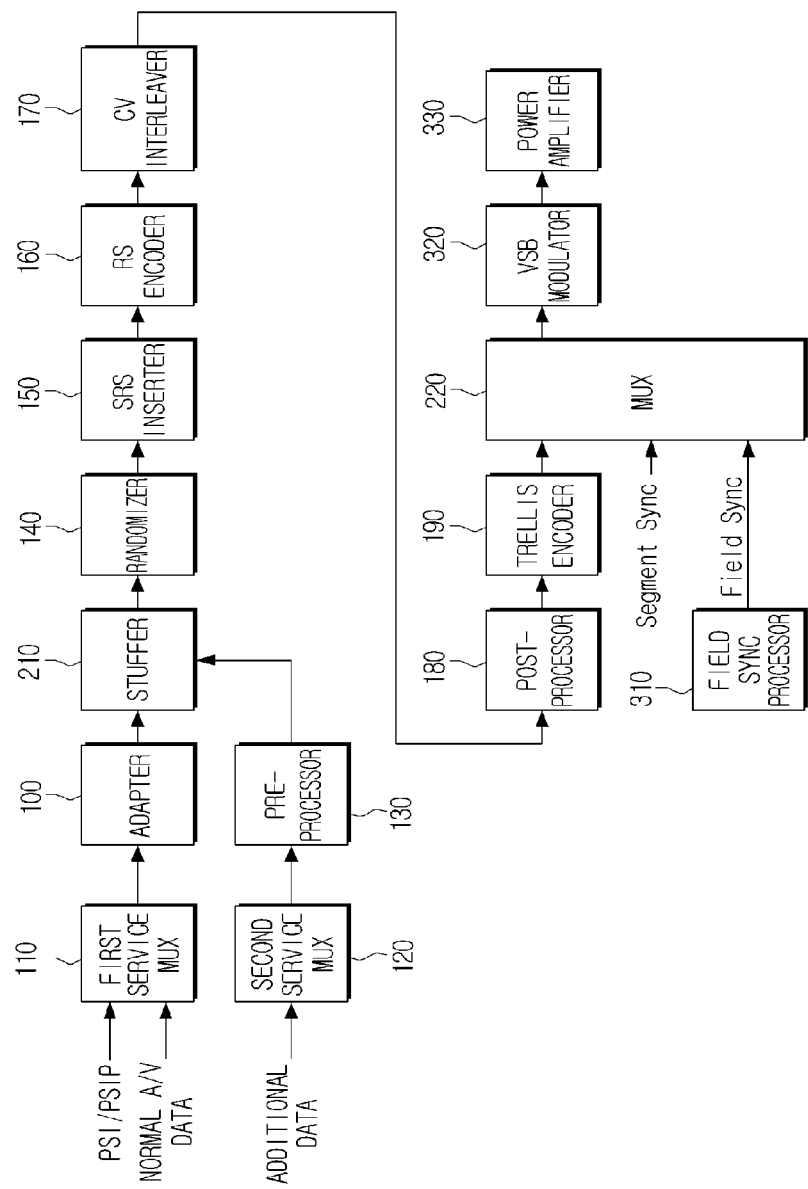
FIG. 2 is a block diagram illustrating a detailed configuration of a digital transmission device according to an embodiment of the present invention.

FIG. 2 is a block diagram illustrating a detailed configuration of a digital transmission device according to an embodiment of the present invention. As illustrated in FIG. 2, the digital transmission device includes a first service multiplexer (MUX) 110, a second service MUX 120, an adapter 100, a stuffer 210, a pre-processor 130, a randomizer 140, a supplementary reference signal (SRS) inserter 150, an Reed Solomon (RS) encoder 160, a convolutional (CV) interleaver 170, a post-processor 180, a trellis encoder 190, a MUX 220, a field sync processor 310 (also referred to as a field sync generator 310), a Vestigial Side Band (VSB) modulator 320, and a power amplifier 330. In FIG. 2, the remaining components other than the first service MUX 110, the second service MUX 120 and the adapter 100 are comprised in the processor 200.

The first service MUX 110 constructs a normal stream by receiving an input of a Program Specific Information/Program and System Information Protocol (PSFPSIP) table along with normal audio data and/or normal video data. In FIG. 2, the first service MUX 110 and the adapter 100 are illustrated as separate components, but it is understood that the operations thereof may also be designed to be performed by a single component.

The normal stream generated by the first service MUX 110 is provided to the adapter 100. As described above, the adapter 100 forms a space for inserting additional data into the normal stream. In greater detail, the space is formed by emptying a portion of the packets constituting the normal stream or by generating an adaptation field in a portion of the packets. The adapter 100 provides the stuffer 210 with the normal stream having the space.

The second service MUX 120 generates an additional stream by receiving an input of additional data to be additionally transmitted. The generated additional stream is provided to the pre-processor 130.

The pre-processor 130 pre-processes the additional stream so that the additional stream is more robust. More specifically, the pre-processor 130 may perform RS encoding, time interleaving, packet formatting, and so on. In addition, the preprocessor 130 may generate a place holder for inserting a parity corresponding to the additional stream. Furthermore, the pre-processor 130 may process a Signaling Information Channel (SIC) as well as the additional stream. The SIC refers to a channel for informing detailed information regarding an additional channel for transmitting the additional data. The SIC may exist as an independent channel, or may be used by allocating part of a particular channel, such as a primary service. The SIC may include additional data location information, time slicing information, additional data decoding information, and so on. That is, when the mode information is transmitted through the SIC, the pre-processor 130 performs RS encoding and interleaving of SIC information including the mode information, and provides the stuffer 210 with the processed SIC information. The second service MUX 120 and the pre-processor 130 may be implemented singly or plurally according to the amount of additional data.

The stuffer 210 inserts the data provided by the pre-processor 130 into the space in the transport stream. That is, the additional data and the SIC data are inserted into the transport stream. Consequently, the mode information together with the additional data are included in the transport stream. A block including the adapter 100, the stuffer 210, and the pre-processor 130 may be referred to as a MUX part.

The transport stream generated by the stuffer 210 is provided to the randomizer 140. The randomizer 140 randomizes the transport stream, and provides the SRS inserter 150 with the randomized transport stream. The SRS inserter 150 inserts a known supplementary reference signal into the transport stream. The supplementary reference signal refers to a signal pattern that is commonly known to both the digital transmission device and the digital reception device. The digital reception device uses the supplementary reference signal in order to improve the reception performance. In FIG. 2, the SRS inserter 150 is illustrated after the randomizer 140. However, it is understood that in other embodiments of the present invention, the supplementary reference signal may be generated before the operation of the stuffer 210, and inserted into the normal stream. Alternatively, the SRS inserter 150 can also be located after the RS encoder 160.

As described above, when the supplementary reference signal is inserted, the RS encoder 160 performs RS encoding and the convolutional interleaver 170 performs convolutional interleaving byte by byte. The post-processor 180 post-processes the interleaved transport stream. The configuration of the post-processor 180 is illustrated in FIG. 3.

Figure 3:
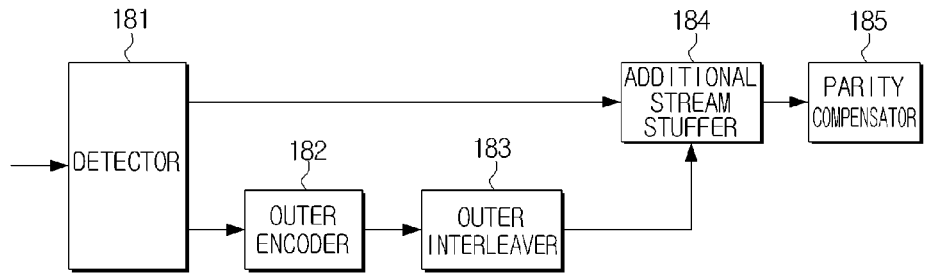
FIG. 3 is a block diagram illustrating a post-processor applied to the digital transmission device of FIG. 2 according to an embodiment of the present invention.

In FIG. 3, the post-processor 180 includes a detector 181, an outer encoder 182, an outer interleaver 183, an additional stream stuffer 184, and a parity compensator 185. The detector 181 detects the additional stream from the transport stream output by the convolutional interleaver 170. The outer encoder 182 adds a parity by encoding the detected additional stream. The parity may be inserted into the place holder generated in the additional stream by the pre-processor 130. The outer interleaver 183 interleaves the encoded additional stream. The additional data stuffer 184 inserts the interleaved additional stream into the transport stream again. The parity compensator 185 compensates the RS parity modified by the encoding of the outer encoder 182. As a result of the operations of the pre-processor 130 and the post-processor 180, the additional stream becomes more robust than the normal stream.

In the configuration of the post-processor 180 in FIG. 3, a byte-to-symbol converter (not shown) may be added prior to the detector 181, and a symbol-to-byte converter (not shown) may be added after the additional stream stuffer 184. The byte-to-symbol converter converts the interleaved transport stream from byte units to symbol units, and the symbol-to-byte converter converts the transport stream from symbol units to byte units. Since the conversion method between byte units and symbol units is known, a detailed description is omitted herein.

Referring back to FIG. 2, the trellis encoder 190 performs trellis-encoding of the transport stream output by the post-processor 180. If a supplementary reference signal has been inserted into the transport stream, the trellis encoder 190 prevents the supplementary reference signal from being modified by initializing a value pre-stored in internal memories into a predetermined value. In more detail, the trellis encoder 190 replaces an input value of two symbols (referred to hereinafter as a 2-symbol input period), right before the supplementary reference signal is input, with a value corresponding to a value pre-stored in the internal memories of the trellis encoder 190, and performs an OR operation, so that each memory is reset during the 2-symbol input period. The corresponding value may be the same value as or a reverse value of the pre-stored value. Parity bits for values pre-stored in each memory are newly calculated, so the existing values are replaced with new values. The location of new parity may be modified if necessary. That is, the trellis encoder 190 modifies a value input in the 2-symbol input section after a parity value is generated by the RS encoder 160, so the trellis encoder 190 corrects a stream into a new codeword taking the modified value into consideration.

The transport stream trellis-encoded in this manner is output to the MUX 220. The field sync processor 310 generates a field sync to be inserted into a plurality of groups of packets, and provides the MUX 220 with the generated field sync. A mode signal area to record the mode information may be formed in the field sync. The detailed configuration of the field sync will be described below. The MUX 220 multiplexes the field sync into the transport stream. In addition, the MUX 220 multiplexes a segment sync into the transport stream. The transport stream output by the MUX 220 is VSB-modulated by the VSB modulator 320, amplified to an appropriate power by the power amplifier 330, and output through a wireless channel.

As described above, the mode information can be transmitted to the reception device through an SIC and/or a field sync. In the embodiment illustrated in FIG. 2, one or more of the components constituting the processor 200 may be omitted, and/or additional components which are not illustrated may be added. In addition, the arrangement order of the components may be modified.

Figure 4:
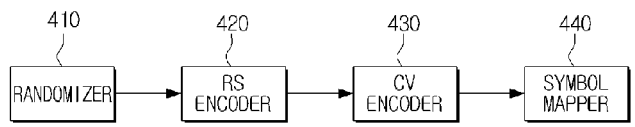
FIG. 4 is a block diagram illustrating a field sync generator applied to the digital transmission device according to an embodiment of the present invention.

FIG. 4 is a block diagram illustrating a field sync generator 310 that may be applied to the digital transmission device according to an embodiment of the present invention. In FIG. 4, the field sync generator 310 includes a randomizer 410, an RS encoder 420, a convolutional (CV) encoder 430, and a symbol mapper 440. The randomizer 410 randomizes mode information to be included in a field sync. The RS encoder 420 and the CV encoder 430 perform RS encoding and convolutional encoding, respectively, of the randomized field sync data, and the symbol mapper 440 maps the converted data using a symbol.

Figure 5:
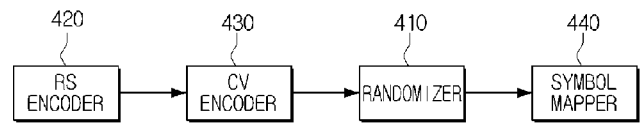
FIG. 5 is a block diagram illustrating a field sync generator according to another embodiment of the present invention.

FIG. 5 is a block diagram illustrating a field sync generator 310 that may be applied to the digital transmission device according to another embodiment of the present invention, in which the randomizer 410 may be located between the CV encoder 430 and the symbol mapper 440. That is, the field sync data is processed in the order of RS encoding, CV encoding, randomization, and symbol mapping.

Figure 6:
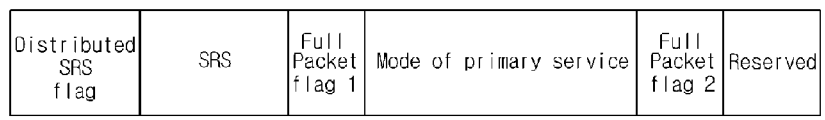
FIG. 6 is a diagram illustrating a configuration of mode information according to an embodiment of the present invention.

FIG. 6 is a diagram illustrating a format of mode information to be transmitted by the digital transmission device according to an embodiment of the present invention. The format in FIG. 6 is formed in bit units. The mode information in FIG. 6 includes a distributed SRS flag (1 bit), an SRS (3 bits), a full packet flag 1 (1 bit), a mode of primary service (5 bits), a full packet flag 2 (1 bit), and a reserved (1 bit).

The "distributed SRS flag" represents whether an SRS is inserted in a distributed pattern, as illustrated in Table 1:

TABLE 1

| Item | Value |
| --- | --- |
| Burst SRS | 0 |
| Distributed SRS | 1 |

Table 1 shows that if a value of the distributed SRS flag is 0, the SRS has been inserted in a burst pattern. Conversely, if a value of the distributed SRS flag is 1, the SRS has been inserted in a distributed pattern.

The "SRS" in FIG. 6 represents the size of an SRS in each packet. The SRS has a different indication according to whether the SRS is inserted in a burst pattern or in a distributed pattern, as illustrated in Tables 2 and 3:

TABLE 2

| In a burst pattern | |
| --- | --- |
| SRS Bytes per Packet | Value |
| 0 | 000 |
| 10 | 001 |
| 15 | 010 |
| 20 | 011 |
| Reserved | 100~111 |

TABLE 3

| In a distributed pattern | |
| --- | --- |
| SRS Bytes per Packet | Value |
| 48 | 000 |
| 56 | 001 |
| 80 | 010 |
| 112 | 011 |
| Reserved | 100~111 |

As illustrated in Tables 2 and 3, the SRS can be expressed by diverse values such as 000, 001, 010, and 011, and thus the value represents the number of SRS bytes per packet.

The "full packet flag 1" in FIG. 6 represents whether a packet including a first byte of the additional data has an adaptive field, as illustrated in Table 4:

TABLE 4

| Item | Value |
| --- | --- |
| When a packet including a first byte of additional data uses an adaptive field | 0 |
| When a packet including a first byte of additional data does not use an adaptive field | 1 |

As illustrated in Table 4, if a value of the full packet flag 1 is 0, a packet including a first byte of additional data transmits the additional data using an adaptive field. Conversely, if a value of the full packet flag 1 is 1, a packet including a first byte of additional data transmits the additional data without using an adaptive field.

The "mode of primary service" in FIG. 6 represents mode information of additional data to be primarily processed. Specifically, the mode information may be illustrated as in Table 5:

TABLE 5

| Size [sector (byte)] | Turbo coding rate | Mode information |
|---|---|---|
| 0 | — | 00000 |
| 4 (32) | ½ | 00001 |
| 4 (32) | ⅓ | 00010 |
| 4 (32) | ¼ | 00011 |
| 8 (64) | ½ | 00100 |
| 8 (64) | ⅓ | 00101 |
| 8 (64) | ¼ | 00110 |
| 12 (96) | ½ | 00111 |
| 12 (96) | ⅓ | 01000 |
| 12 (96) | ¼ | 01001 |
| 16 (128) | ½ | 01010 |
| 16 (128) | ⅓ | 01011 |
| 16 (128) | ¼ | 01100 |
| 32 (256) | ½ | 01101 |
| 32 (256) | ⅓ | 01110 |
| 32 (256) | ¼ | 01111 |
| 44 (352) | ½ | 10000 |
| 44 (352) | ⅓ | 10001 |
| 44 (352) | ¼ | 10010 |
| Reserved |  | 10011~11111 |

Though Table 5 only illustrates the size of additional data and the coding rate, it is understood that the mode information may include other information, such as the data rate.

The "full packet flag 2" in FIG. 6 represents whether an adaptive field appears in a last sector in a similar manner as illustrated in Table 4. The "reserved" in FIG. 6 is an area which is reserved for other uses.

Figure 7:
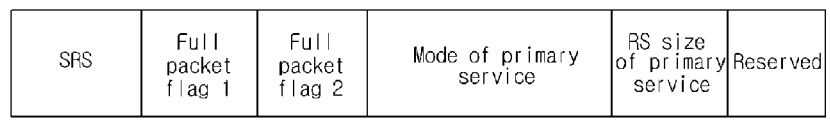
FIG. 7 is a diagram illustrating a configuration of mode information according to another embodiment of the present invention.

FIG. 7 is a diagram illustrating a format of the mode information according to another embodiment of the present invention. In FIG. 7, the mode information is configured in the order of an SRS, a full packet flag 1, a full packet flag 2, a mode of primary service, an RS size of primary service, and a reserved (1 bit).

The full packet flag 1, the full packet flag 2, the SRS, the mode of primary service, and the reserved fields correspond to those in FIG. 6. If the SRS is only transmitted in a distributed format, the "distributed SRS flag" may be omitted as in FIG. 7, and the SRS may be shown using Table 6:

TABLE 6

| SRS Bytes per Packet | Value |
|---|---|
| 0 | 000 |
| 48 | 001 |
| 56 | 010 |
| 80 | 011 |
| 112 | 100 |
| Reserved | 101~111 |

Furthermore, the "RS size of primary service" in FIG. 7 represents the size of RS of additional data to be primarily processed, as illustrated in Table 7:

TABLE 7

| Item | Value |
|---|---|
| RS (208,188) | 0 |
| RS (208,168) | 1 |

The mode information as bit units, as shown in FIGS. 6 and 7, is converted to symbol units by the field sync generator 310.

Figure 8:
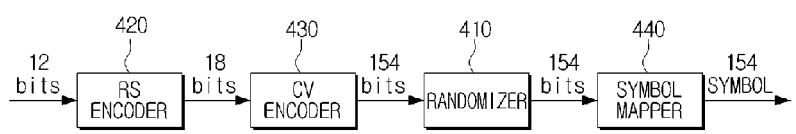
FIG. 8 is a diagram illustrating a process of mode information according to an embodiment of the present invention.

FIG. 8 is a diagram illustrating an operation of the field sync generator 310. As illustrated in FIG. 8, the RS encoder 420 adds an RS parity to mode information of 12 bits. If an RS(6,4) encoder of GF(8) is used as the RS encoder 420, the mode information becomes 18 bits after RS encoding. Subsequently, the mode information is convolutional-encoded by the CV encoder 430. In this case, if 1/7 rate tail biting convolutional coding is performed, the mode information becomes 154 bits. That is, if 4 tail bits are added to the mode information of 18 bits and 1/7 convolutional coding is performed, mode information of 154 bits is generated. The convolutional-encoded mode information is converted into mode information of 154 symbols by going through randomization and symbol mapping. The symbol mapper 440 may perform symbol mapping using the following symbol map In Table 8:

TABLE 8

| Value of bit | Symbol |
|---|---|
| 0 | −5 |
| 1 | +5 |

If the entire mode information cannot be inserted into a mode signal area in a single field sync due to an insufficient size of the mode signal area, the MUX 220 can distribute the mode information in a plurality of field syncs. This will be explained below.

Figure 9:
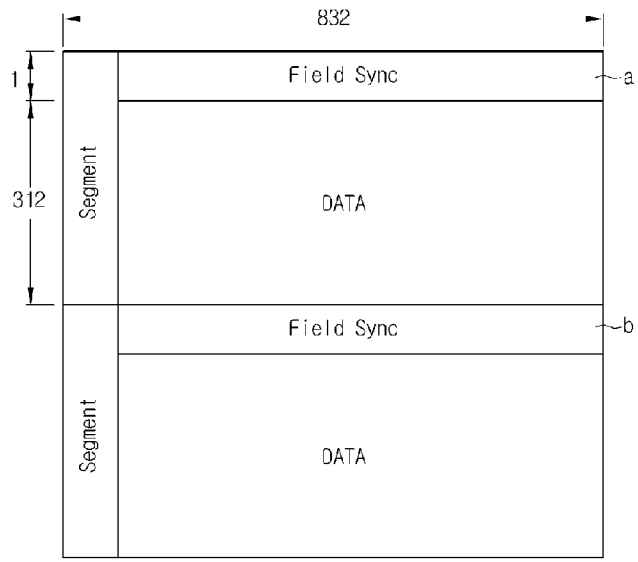
FIG. 9 is a diagram illustrating a configuration of a transport stream according to an embodiment of the present invention.

FIG. 9 is a diagram illustrating a configuration of a frame of a transport stream to be transmitted by the digital transmission device according to an embodiment of the present invention. In FIG. 9, one frame includes two fields, and one field includes one field sync segment a or b that is a first segment, and 312 data segments. In a VSB data frame, a single segment can contain the same amount of information as a single MPEG-2 packet. That is, in the frame, one field sync packet a or b is added to each group of 312 packets. One segment, that is, one packet includes a segment sync of 4 symbols, and 828 data symbols, and thus has 832 symbols in total.

Figure 10:
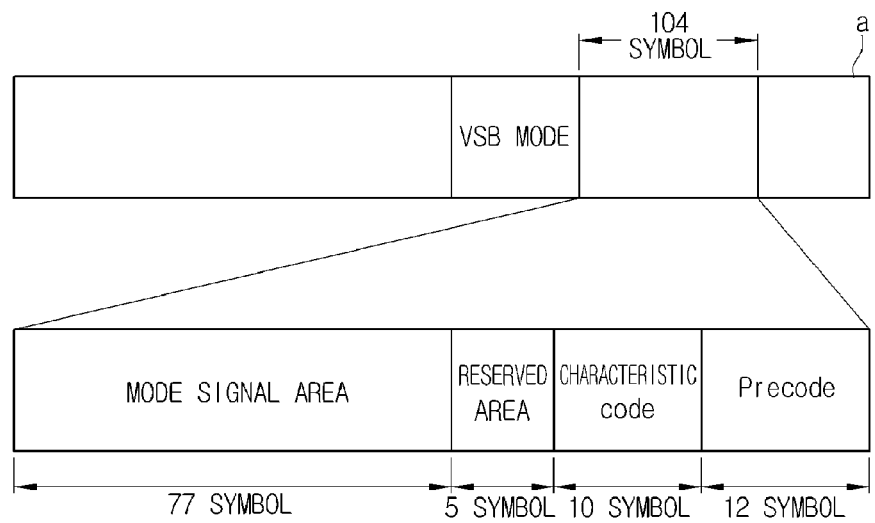
FIG. 10 is a diagram illustrating a configuration of a field sync contained in a transport stream according to an embodiment of the present invention.

FIG. 10 is a diagram illustrating a configuration of a first field sync segment a that is added to a first field in a frame of a transport stream. As illustrated in FIG. 10, a mode signal area is included in a predetermined area of the first field sync segment a. Although not shown in FIG. 10, a PN sequence (such as PN511 or PN63), or VSB mode information can be included.

In a conventional standard, a total of 104 symbols are defined as a reserved area. In the digital transmission device according to an embodiment of the present invention, part of the reserved area is used as a mode signal area to record the mode information. The size of the mode signal area may be 77 symbols as shown, but the invention is not limited thereto. Among the reserved area of 104 symbols, the last 12 symbols are used as a pre-code area, and the 10 symbols preceding the pre-code area are used as a characteristic code area. In the characteristic code area, a code representing the characteristics of the additional data (such as its version, provider, and an improvement format identifier) is recorded.

If the additional data is inserted into diverse areas and have diverse types, the size of the mode information may be too large to be expressed using only 77 symbols. Accordingly, in the digital transmission device according to an embodiment of the present invention, the mode information can be expressed using two or more field syncs. That is, the mode information is divided and inserted into the two field syncs a and b in a single frame as illustrated in FIG. 9.

Figure 11:
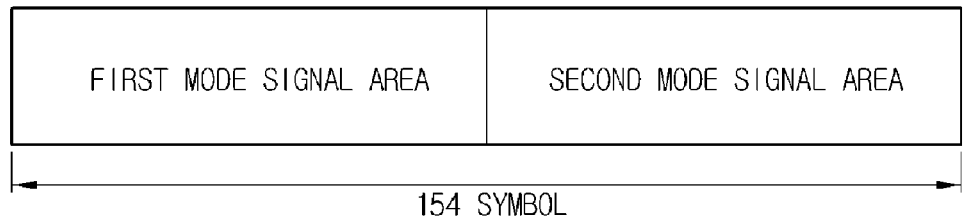
FIG. 11 is a diagram illustrating an embodiment of using a plurality of field syncs.

FIG. 11 is a diagram illustrating a form of mode information distributed in the two field syncs a and b according to an embodiment of the present invention. In FIG. 11, the mode information of 154 symbols in total can be distributed and recorded in first and second mode signal areas of 77 symbols each. Consequently, mode information of diverse sizes can be provided.

Figure 12:
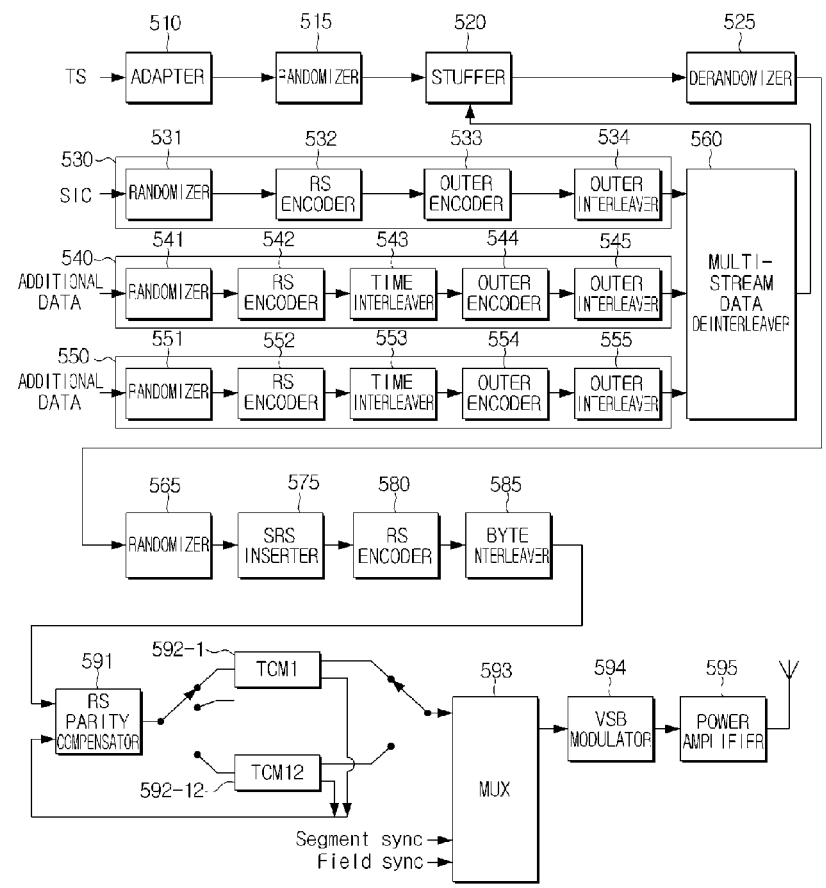
FIG. 12 is a block diagram illustrating a digital transmission device according to another embodiment of the present invention.

FIG. 12 is a block diagram illustrating a digital transmission device according to another embodiment of the present invention, in which the digital transmission device includes an adapter 510, a randomizer 515, a stuffer 520, a derandomizer 525, an SIC processor 530, a plurality of additional data processors 540 and 550, a multi-stream data deinterleaver 560, a randomizer 565, a supplementary reference signal (SRS) inserter 575, an RS encoder 580, a byte interleaver 585, an RS parity compensator 591, trellis-coded modulation encoder (TCM) 1 to TCM 12 592-1 to 592-12, a MUX 593, a VSB modulator 594, and a power amplifier 595.

The adapter 510 forms a space in a transport stream, and provides the randomizer 140 with the transport stream. The randomizer 515 randomizes the transport stream. In this case, the adapter 510 may externally receive the mode information and form the space in a position designated by the mode information.

The SIC processor 530 includes a randomizer 531, an RS encoder 532, an outer encoder 533, and an outer interleaver 534. If SIC data is externally received, the randomizer 531 randomizes the received SIC data, and the RS encoder 532, the outer encoder 533, and the outer interleaver 534 perform RS encoding, outer encoding, and outer interleaving of the randomized SIC data in sequence. The SIC data processed in this manner is provided to the multi-stream data deinterleaver 560.

The plurality of additional data processors 540 and 550 receive corresponding additional data streams. The processors 540 and 550 include randomizers 541 and 551, RS encoders 542 and 552, time interleavers 543 and 553, outer encoders 544 and 554, and outer interleavers 545 and 555. The plurality of additional data processors 540 and 550 perform randomization, RS encoding, time interleaving, outer encoding, and outer interleaving of additional data that is externally provided, and provide the processed additional data to the multi-stream data deinterleaver 560. Though two additional data processors 540 and 550 are illustrated in FIG. 12, it is understood that the number of additional data processors can be 1 or more than 2 according to other embodiments.

The multi-stream data deinterleaver 560 deinterleaves data provided by the SIC processor 530 and the additional data processors 540 and 550 and provides the stuffer 520 with the deinterleaved data. In this case, the multi-stream data deinterleaver 560 may insert the additional data into a location set in the transport stream by the mode information and perform deinterleaving. The SIC data may always be inserted in a fixed location regardless of the mode. The stuffer 520 inserts the data into the space in the transport stream. Consequently, the transport stream includes the additional data inserted in a location defined by the mode information. The derandomizer 525 derandomizes the transport stream. In FIG. 12, a block including the adapter 510, the randomizer 515, the stuffer 520, the derandomizer 525, the SIC processor 530, the additional data processors 540 and 550, and the multi-stream data deinterleaver 560 may be referred to as a MUX part.

The stream processed by the MUX part is provided to the randomizer 565 for randomization. The SRS inserter 575 inserts an SRS into the transport stream according to the mode information. It is understood that the SRS inserter 575 may be placed after the RS encoder 580 in other embodiments. Subsequently, the RS encoder 580 and the byte interleaver 585 perform RS encoding and byte interleaving on the transport stream including the SRS.

The byte-interleaved transport stream is provided to a trellis encoder. The trellis encoder includes the RS parity compensator 591, and the TCM 1 to TCM 12 592-1 to 592-12. The RS parity compensator 591 transmits the transport stream to the TCM 1 to TCM 12 592-1 to 592-12. The TCM 1 to TCM 12 592-1 to 592-12 perform trellis-encoding of the transport stream in sequence, using each internal memory. Therefore, initialization of the memories is performed before SRS processing. The RS parity compensator 591 compensates a parity for a value modified by initialization of the memories with an accurate value. The location of the parity may be changed if necessary. After trellis-encoding, the MUX 593 multiplexes the trellis-encoded transport stream with a segment sync and a field sync. The field sync may be generated to include separate mode information before being provided to the MUX 593. The multiplexed transport stream is modulated by the VSB modulator 594, is amplified to be appropriate for transmission by the power amplifier 595, and is transmitted through an antenna.

Figure 13:
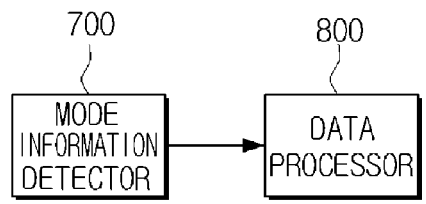
FIG. 13 is a block diagram illustrating a digital reception device according to an embodiment of the present invention.

FIG. 13 is a block diagram illustrating a digital reception device according to an embodiment of the present invention. As illustrated in FIG. 13, the digital reception device includes a mode detector 700 and data processor 800. The mode detector 700 receives a transport stream in which normal data and additional data are mixed, and detects mode information from at a field sync and/or a SIC included in the transport stream. The data processor 800 processes the transport stream using the detected mode information.

The mode information may have been inserted into one or both of the field sync and the SIC according to various embodiments of the present invention. If the mode information has been inserted into the field sync, the mode information detector 700 may be implemented as a field sync processor (not shown) that detects and processes the field sync. If the mode information has been inserted into the SIC, the mode information detector 700 may be implemented as an additional data processor (not shown) that detects and restores additional data and the SIC from the transport stream. If the mode information has been inserted into both the field sync and the SIC, the mode information detector 700 may be implemented as both a field sync processor and an additional data processor. As described above, the mode information detector 700 can be configured as one or more components according to aspects of the present invention, while the remaining components of the digital reception device other than the mode information detector 700 belong to the data processor 800.

The mode information detector 700 detects the mode information and provides the data processor 800 with the mode information. In more detail, the mode information may be information used to process additional data or a supplementary reference signal (SRS), and may be a coding rate, a data rate, an insertion position, a type of used error correction code, primary service information of additional data, an insertion pattern of the supplementary reference signal, information regarding a size of the supplementary reference signal, information used to support time slicing, a description of the additional data, information regarding modification of the mode information, and/or information to support an IP service.

The data processor 800 receives and uses the detected mode information in order to process the transport stream. More specifically, the data processor 800 identifies the location of an SRS that is recorded in the mode information, and detects and uses the SRS in order to perform equalization or forward error correction (FEC). In addition, the data processor 800 identifies the insertion pattern of the additional data, the data rate, and the data coding rate that are recorded in the mode information, detects the additional data in the identified location, and decodes and restores the additional data. If the digital transmission device has distributed and recorded the mode information in a plurality of field syncs, the mode information detector 700 detects the mode information by combining mode signal areas provided in the plurality of field syncs.

Figure 14:
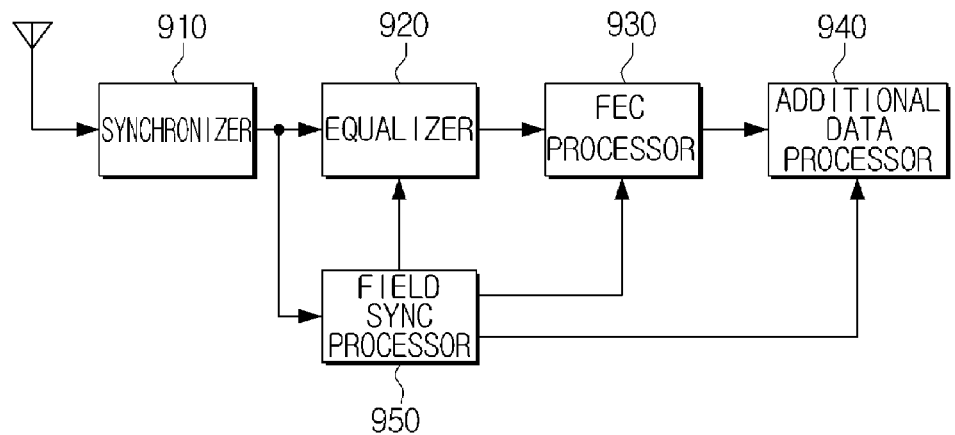
FIG. 14 is a block diagram illustrating a detailed configuration of a digital reception device according to an embodiment of the present invention.

FIG. 14 is a block diagram illustrating a detailed configuration of a digital reception device according to an embodiment of the present invention. As illustrated in FIG. 14, the digital reception device includes a synchronizer 910, an equalizer 920, an FEC processor 930, an additional data processor 940, and a field sync processor 950. The additional data processor 940 and/or the field sync processor 950 may correspond to the mode information detector 700 in FIG. 13. For example, if the mode information is contained only in the field sync, the field sync processor 950 corresponds to the mode information detector 700, and the additional data processor 940 corresponds to the data processor 800. Alternatively, if the mode information is contained only in the SIC, the additional data processor 940 corresponds to the mode information detector 700, and the field sync processor 950 corresponds to the data processor 800. Moreover, if the mode information is contained in both the SIC and the field sync, the additional data processor 940 and the field sync processor 950 jointly correspond to the mode information detector 700.

Referring to FIG. 14, the synchronizer 910 synchronizes the transport stream received through a wireless channel, and the equalizer 920 equalizes the synchronized transport stream. The FEC processor 930 performs forward error correction of the equalized transport stream. The additional data processor 940 processes the additional data stream in the forward-error-corrected transport stream. In this case, the additional data processor 940 may also process the SIC data in the transport stream. Therefore, if the mode information is contained in the SIC data, the additional data processor 940 detects the additional data stream in a location defined by the mode information, and processes the additional data stream. While not shown, if the mode information in the SIC data includes the insertion location and the insertion pattern of the SRS, the additional data processor 940 may provide the equalizer 920 and the FEC processor 930 with this information.

Furthermore, the field sync processor 950 detects a field sync from the transport stream. If the field sync contains mode information, the field sync processor 950 restores the mode information, and provides the equalizer 920, the FEC processor 930, and the additional data processor 940 with the restored mode information. The field sync processor 950 may be located after the equalizer 920 according to the implementation of the reception device.

The equalizer 920 and the FEC processor 930 detect the SRS from the transport stream using information regarding the insertion location and the insertion pattern of the SRS from among the mode information, so that the SRS can be used for equalization and forward error correction. However, it is understood that in other embodiments, the SRS may not be used for forward error correction.

The additional data processor 940 detects the additional data in the transport stream using the location of the additional data from among the mode information, and decodes the additional data appropriately.

In FIG. 14, the components are arranged such that the additional data is processed after FEC. That is, FEC for the entire transport stream is performed. However, it is understood that in other embodiments, the additional data may be detected from the transport stream such that the FEC is performed on only the additional data. Moreover, the FEC processor 930 and the additional data processor 940 may be implemented in one block.

Figure 15:
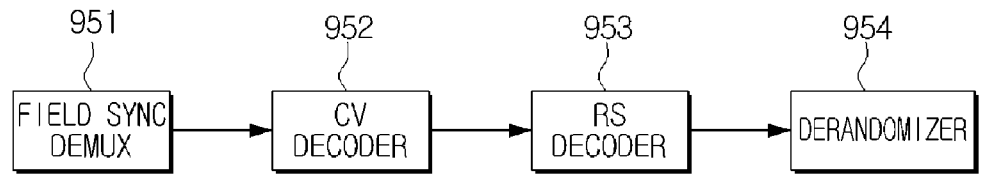
FIG. 15 is a block diagram illustrating a field sync processor applied to the digital transmission device according to an embodiment of the present invention.

FIG. 15 is a block diagram illustrating the field sync processor 950 according to an embodiment of the present invention. Referring to FIG. 15, the field sync processor 950 includes a field sync DEMUX 951, a CV decoder 952, an RS decoder 953, and a derandomizer 954. The field sync DEMUX 951 demultiplexes a mode signal area of field sync data in a transport stream. Accordingly, when the field sync data is detected, the CV decoder 952 performs convolutional decoding of the mode signal area of the field sync data. The RS decoder 953 performs RS decoding of the CV-decoded data. The derandomizer 954 derandomizes the RS-decoded field sync data, and restores the mode information inserted in the mode signal area of the field sync. Consequently, the restored mode information can be used for processing the transport stream and the additional data stream.

Figure 16:
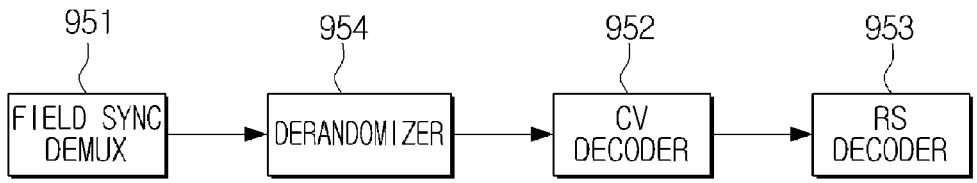
FIG. 16 is a block diagram illustrating a field sync processor applied to the digital transmission device according to another embodiment of the present invention.

FIG. 16 is a block diagram illustrating the field sync processor 950 according to another embodiment of the present invention. In FIG. 16, the field sync processor 950 is implemented in the order of the field sync DEMUX 951, the derandomizer 954, the CV decoder 952, and the RS decoder 953. Therefore, after the field sync data is demultiplexed and detected, derandomization, CV decoding, and RS decoding are performed in sequence.

Each component of the field sync processors 950 respectively illustrated in FIGS. 15 and 16 can be omitted or added depending on a method of generating a field sync by a transmission device and an embodiment of the present invention, and the order thereof can also be modified.

Figure 17:
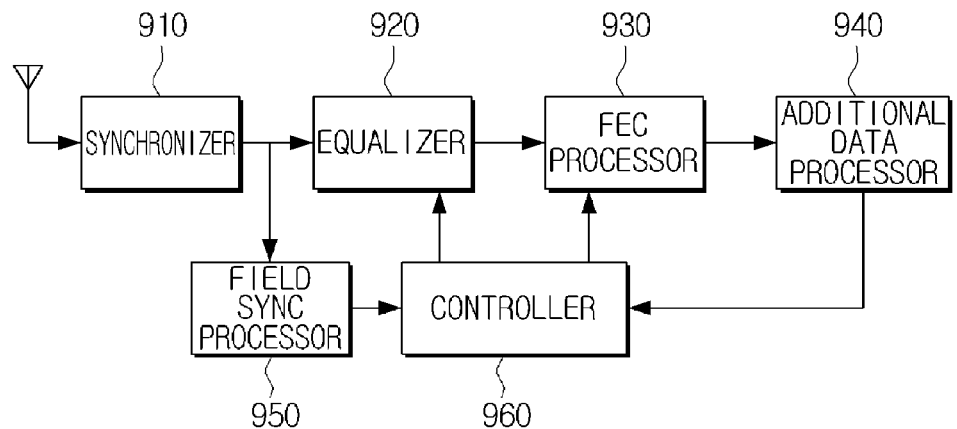
FIG. 17 is a block diagram illustrating a detailed configuration of a digital reception device according to another embodiment of the present invention.

FIG. 17 is a block diagram illustrating a digital reception device according to another embodiment of the present invention. As illustrated in FIG. 17, the digital reception device includes a synchronizer 910, an equalizer 920, an FEC processor 930, an additional data processor 940, a field sync processor 950, and a controller 960. The controller 960 outputs control signals to the equalizer 920 and the FEC processor 930 using the mode information. The controller 960 may receive an input of the mode information processed by the additional data processor 940 and/or the field sync processor 950. Alternatively, the controller 960 may directly detect mode information from data processed by the additional data processor 940 and/or the field sync processor 950.

In FIG. 17, the components are arranged in a way such that the additional data is processed after FEC. That is, FEC for the entire transport stream is performed. However, it is understood that in other embodiments, the additional data may be detected from the transport stream such that the FEC is performed on only the additional data. Moreover, the FEC processor 930 and the additional data processor 940 may be implemented in one block.

Figure 18:
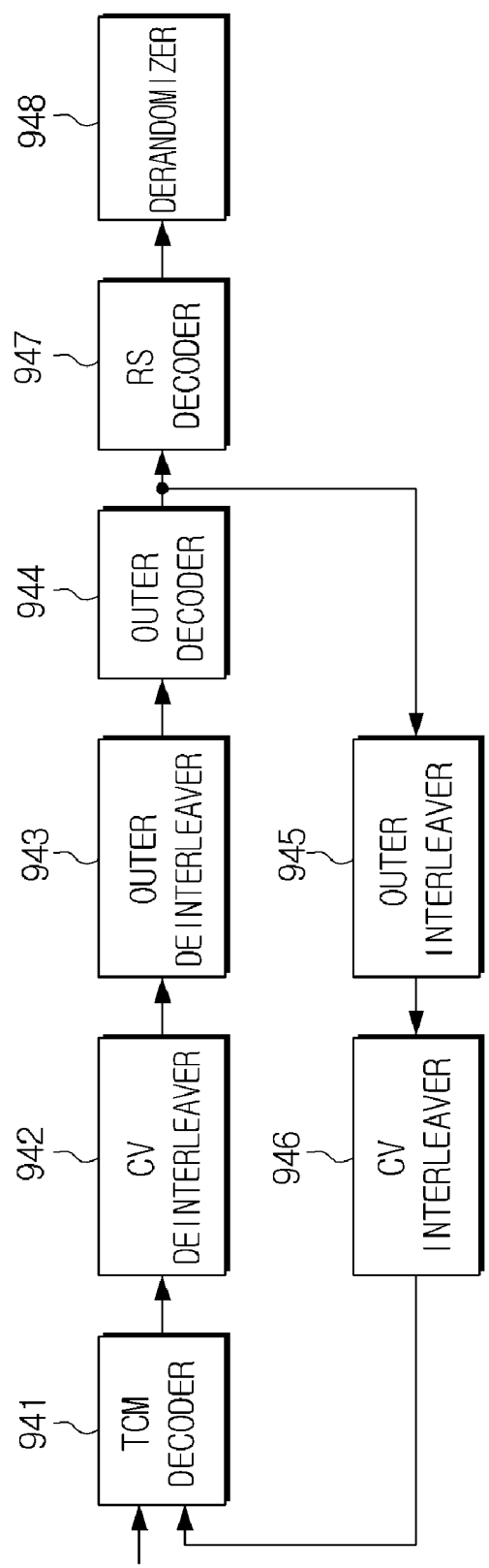
FIG. 18 is a block diagram illustrating a configuration of an additional data processor applied to the digital reception device according to an embodiment of the present invention.

FIG. 18 is a block diagram illustrating a configuration of the additional data processor 940 applied to the digital reception device according to an embodiment of the present invention. As illustrated in FIG. 18, the additional data processor 940 includes a TCM decoder 941, a CV deinterleaver 942, an outer deinterleaver 943, an outer decoder 944, an outer interleaver 945, a CV interleaver 946, an RS decoder 947, and a derandomizer 948.

The TCM decoder 941 detects an additional stream from a transport stream output from the FEC processor 930, and performs a trellis decoding of the additional stream. The CV deinterleaver 942 performs CV-deinterleaving of the trellis-decoded additional stream. According to the configuration of the transmission device, the CV deinterleaver 942 may be omitted in the additional data processor 940. The outer deinterleaver 943 performs outer deinterleaving, and the outer decoder 944 decodes the additional stream so that a parity added to the additional stream is removed.

In some cases, in order to improve the reception performance for the additional data, the process from the TCM decoder 941 to the outer decoder 944 may be repeated. For the repeated process, the data decoded by the outer decoder 944 goes through the outer interleaver 945 and the CV interleaver 946 to the TCM decoder 941. The CV interleaver 946 may be omitted in the additional data processor 940 according to the configuration of the transmission device.

The trellis-decoded additional stream is provided to the RS decoder 947. The RS decoder 947 performs RS decoding of the additional stream, and the derandomizer 948 derandomizes the additional stream. Consequently, the additional stream data is restored.

Figure 19:
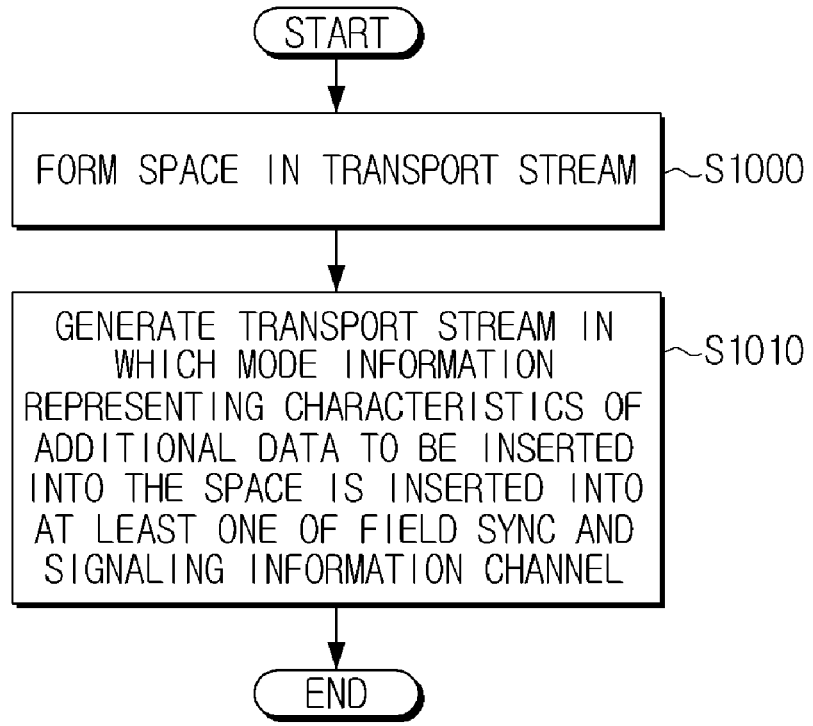
FIG. 19 is a flow chart illustrating a method of processing a stream in a digital transmission device according to an embodiment of the present invention.

FIG. 19 is a flow chart illustrating a method of processing a stream in a digital transmission device according to an embodiment of the present invention. As illustrated in FIG. 19, a space for inserting additional data is formed in a transport stream in operation S1000. The transport steam containing the additional data in the space and mode information representing the characteristics of the additional data is generated in operation S1010. The mode information may be inserted into a field sync and/or an SIC.

Figure 20:
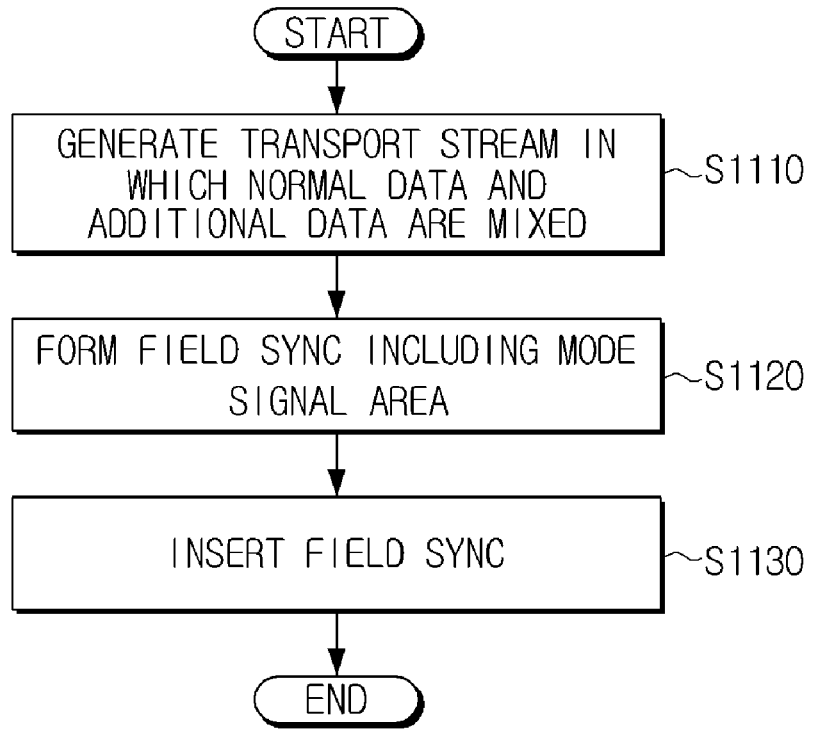
FIG. 20 is a flow chart illustrating a method of processing a stream by transmitting mode information using a field sync according to an embodiment of the present invention.

FIG. 20 is a flow chart illustrating a method of processing a stream by transmitting mode information using a field sync according to an embodiment of the present invention. As illustrated in FIG. 20, a transport stream in which normal data and additional data are mixed is generated in operation S1110. Subsequently, a field sync including a mode signal area is formed in operation S1120. In the mode signal area, mode information is recorded. The field sync can be configured as described above with reference to FIG. 10. After the field sync is configured, a digital transmission device inserts the field sync into the transport stream in operation S1130. In more detail, a single field sync can be inserted into every processing unit that is preset. In this case, mode information can also be distributed in a plurality of field syncs as illustrated in FIG. 11. If the mode information is contained in a SIC, the mode information can be processed in the same manner as the additional data.

Figure 21:
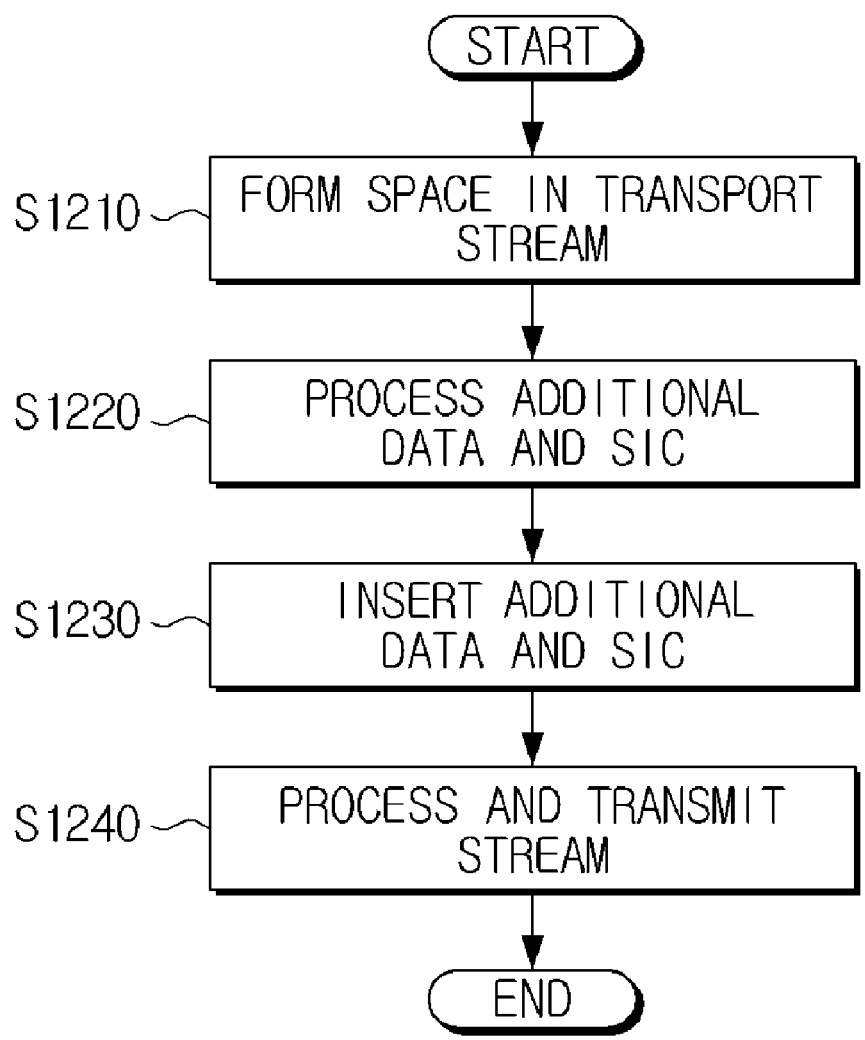
FIG. 21 is a flow chart illustrating a method of processing a stream by transmitting mode information using an SIC according to an embodiment of the present invention.

FIG. 21 is a flow chart illustrating a method of processing a stream by inserting mode information into an SIC according to an embodiment of the present invention. As illustrated in FIG. 21, a space for inserting the additional data into a transport stream is formed in operation S1210, and the additional data and an SIC are processed in operation S1220. It is understood that operations S1210 and S1220 may be performed sequentially or concurrently. The SIC including mode information is provided from an external source, randomized, encoded, and interleaved. Detailed method of processing the SIC and the additional data is given above with reference to FIG. 12, so a description thereof is not repeated here.

The processed SIC and additional data are inserted into the space provided in the transport stream in operation S1230. Following this process, the transport stream is formed. The formed transport stream goes through randomization, encoding, interleaving, trellis encoding, and modulation, and is transmitted through a channel in operation S1240.

Figure 22:
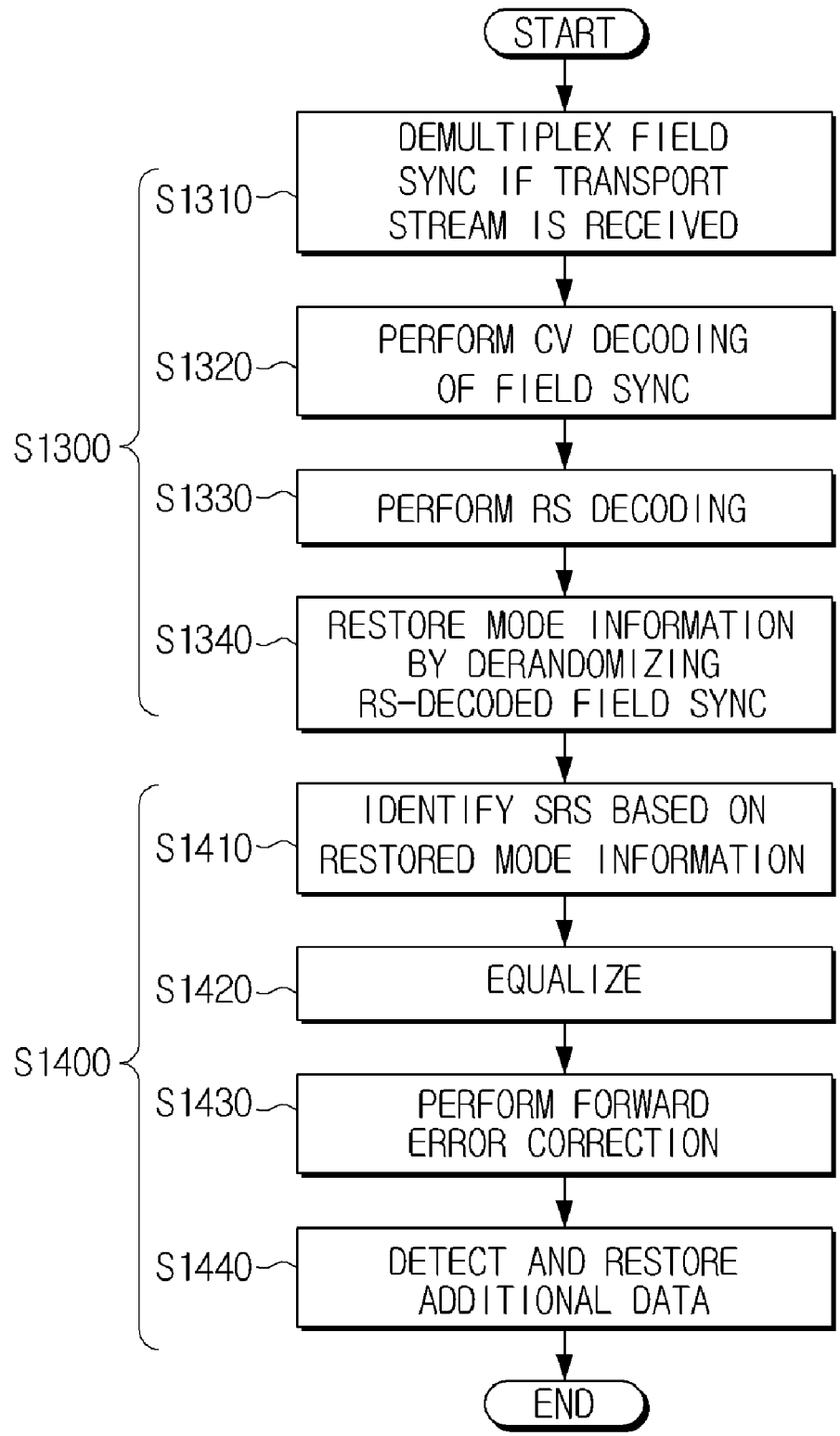
FIG. 22 is a flow chart illustrating a method for processing a stream in a digital reception device according to an embodiment of the present invention.

FIG. 22 is a flow chart illustrating a method of processing a stream in a digital reception device according to an embodiment of the present invention. As illustrated in FIG. 22, the method includes detecting mode information from a transport stream in operation S1300 and processing the transport stream using the detected mode information in operation S1400. The mode information may be detected from a field sync or an SIC of the transport stream.

In FIG. 22, it is assumed that the mode information is detected from a field sync. Accordingly, if the transport stream is received, a mode signal area of the field sync is demultiplexed in operation 81310. The received transport stream includes normal data and additional data. The additional stream data may include various types of a plurality of stream data that are provided by a plurality of providers. If data is detected from the mode signal area of the field sync, the detected data is CV-decoded in operation S1320. Subsequently, the CV-decoded field sync data is RS-decoded in operation S1330 and randomized so that mode information is restored in operation S1340. The restored mode information may include the coding rate, the data rate, the insertion position, the type of used error correction code, primary service information of the additional data, and/or the insertion pattern and information regarding the size of an SRS.

The SRS is identified based on the location identified using the restored mode information in operation S1410, and the transport stream is equalized using the identified SRS in operation S1420. Also, forward error correction of the equalized transport stream is performed in operation S1430, and the additional stream is detected from the corrected transport stream and decoded. As a result, the additional data is restored in S1440. Since these operations have been described above, a detailed description is not repeated here.

It is understood that, in other embodiments, the order of operations may vary from that shown in FIG. 22. For example, derandomization (operation S1340) may be performed directly after demultiplexing (operation S1310). Furthermore, forward error correction (operation S1430) may be performed for only the additional data stream from among parts of the transport stream. In addition, forward error correction (operation S1430) and detection and restoration of the additional data (operation S1440) may be performed concurrently or substantially concurrently. The SRS can be used for forward error correction (operation 81430) as well as for equalization.

Aspects of the present invention may be applied to a digital broadcast system. Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A digital transmission device to process a transport stream comprising normal data, the digital transmission device comprising:
   a processor to generate the transport stream in which additional data is inserted into the transport stream, and to insert information representing characteristics of the additional data into a signaling channel of the transport stream,
   wherein the additional data is error-correction encoded before being inserted into the transport stream so that the additional data is more robust than the normal data.

2. The digital transmission device of claim 1, wherein the processor comprises:
   a field sync generator to generate a field sync including the information representing the characteristics of the additional data; and
   a multiplexer (MUX) to multiplex the generated field sync with the transport stream.

3. The digital transmission device of claim 1, wherein the processor comprises:
a stuffer to insert the additional data and the signaling channel including the information representing the characteristics of the additional data into the transport stream.

4. The digital transmission device of claim 1, wherein the processor comprises:
a stuffer to insert the additional data and the signaling channel including the information representing the characteristics of the additional data into the transport stream;
a field sync generator to generate a field sync including the information representing the characteristics of the additional data; and
a MUX to multiplex the generated field sync with the transport stream.

5. The digital transmission device of claim 1, further comprising:
a supplementary reference signal (SRS) inserter to insert an SRS into the transport stream,
wherein the information representing the characteristics of the additional data is information used to process the additional data and/or the SRS, and includes a coding rate, a data rate, an insertion position, a type of a used error correction code, primary service information, an insertion pattern of the SRS, information regarding a size of the SRS, information used to support time slicing, a description of the additional data, information regarding modification of the information representing the characteristics of the additional data, and/or information to support an Internet protocol (IP) service.

6. The digital transmission device of claim 2, wherein the information representing the characteristics of the additional data is distributed and inserted in a plurality of field syncs.

7. The digital transmission device of claim 1, further comprising:
a plurality of additional data processors to receive and separately process a respective plurality of additional data; and
a stuffer to insert the plurality of processed additional data into the transport stream.

8. The digital transmission device of claim 1, wherein the adaptor receives the information representing the characteristics of the additional data and forms the space in a position of the transport stream designated by the received information representing the characteristics of the additional data.

9. The digital transmission device of claim 1, further comprising:
a pre-processor to perform pre-processing the additional data to be more robust than the normal data,
wherein the pre-processing includes the error-correction encoding, and
wherein the processor generates the transport stream in which the robust additional data is inserted.

10. The digital transmission device of claim 3, further comprising:
a pre-processor to perform RS encoding and/or interleaving of the signaling channel including the information representing the characteristics of the additional data,
wherein the stuffer inserts the RS encoded and/or interleaved signaling channel including the information representing the characteristics of the additional data into the transport stream.

11. A method for processing a transport stream comprising normal data by a digital transmission device, the method comprising:
generating, by the digital transmission device, the transport stream in which information representing characteristics of the additional data, inserted into the transport stream, is inserted into a signaling channel of the transport stream,
wherein the additional data is error-correction encoded before being inserted into the transport stream so that the additional data is more robust than the normal data.

12. The method of claim 11, wherein the generating of the transport stream comprises:
generating a field sync including the information representing the characteristics of the additional data; and
multiplexing the generated field sync with the transport stream.

13. The method of claim 11, wherein the generating of the transport stream comprises:
inserting the additional data and the signaling channel including the information representing the characteristics of the additional data into the transport stream.

14. The method of claim 11, wherein the generating of the transport stream comprises:
inserting the additional data and the signaling channel including the information representing the characteristics of the additional data into the transport stream;
generating a field sync including the information representing the characteristics of the additional data; and
multiplexing the generated field sync with the transport stream.

15. The method of claim 11, further comprising:
inserting a supplementary reference signal (SRS) into the transport stream,
wherein the information representing the characteristics of the additional data is information used to process the additional data and/or the SRS, and includes a coding rate, a data rate, an insertion position, a type of a used error correction code, primary service information, an insertion pattern of the SRS, information regarding a size of the SRS, information used to support time slicing, a description of the additional data, information regarding modification of the information representing the characteristics of the additional data, and/or information to support an Internet protocol (IP) service.

16. The method of claim 12, wherein the information representing the characteristics of the additional data is distributed and inserted in a plurality of field syncs.

17. A digital reception device to receive a transport stream including normal data and additional data, the digital reception device comprising:
an information detector to detect information representing characteristics of the additional data from a signaling channel of the transport stream; and
a data processor to process the transport stream using the detected information representing the characteristics of the additional data,
wherein the additional data is error-correction encoded before being inserted into the transport stream at a transmitter of the transport stream so that the additional data is more robust than the normal data.

18. The digital reception device of claim 17, wherein the information detector detects information representing characteristics of the additional data from a field sync of the transport stream, and restores the information representing the characteristics of the additional data included in the field sync by demultiplexing the field sync and performing an operation corresponding to a forward error correction (FEC) performed for the information representing the characteristics of the additional data by a digital transmission device from which the transport stream is received.

19. The digital reception device of claim 18, wherein the data processor comprises:
   a synchronizer to synchronize the transport stream;
   an equalizer to equalize the synchronized transport stream;
   a forward error correction (FEC) processor to perform forward error correction of the equalized transport stream; and
   an additional data processor to detect and restore the additional data from the forward error corrected transport stream based on a location identified by the restored information representing the characteristics of the additional data.

20. The digital reception device of claim 18, wherein the data processor comprises:
   a synchronizer to synchronize the transport stream;
   an equalizer to equalize the transport stream; and
   a forward error correction (FEC) processor to detect the additional data from the equalized transport stream using the detected information representing the characteristics of the additional data, and to perform forward error correction of the additional data.

21. The digital reception device of claim 17, wherein the information detector comprises an additional data processor to detect and process the signaling channel and the additional data from the received transport stream, and to detect the information representing the characteristics of the additional data from the detected and processed signaling channel.

22. The digital reception device of claim 17, further comprising:
   a controller to detect a supplementary reference signal (SRS) included in the transport stream based on the detected information representing the characteristics of the additional data.

23. The digital reception device of claim 22, wherein the data processor comprises:
   an equalizer to perform channel equalization using the SRS; and
   a forward error correction (FEC) processor to perform forward error correction using the SRS.

24. The digital reception device of claim 22, wherein the information representing the characteristics of the additional data is information used to process the additional data and/or the SRS, and includes a coding rate, a data rate, an insertion position, a type of a used error correction code, primary service information, an insertion pattern of the SRS, information regarding a size of the SRS, information used to support time slicing, a description of the additional data, information regarding modification of the information representing the characteristics of the additional data, and/or information to support an Internet protocol (IP) service.

25. The digital reception device of claim 18, wherein the information detector detects the information representing the characteristics of the additional data by combining mode signal areas formed in each of a plurality of field syncs of the transport stream.

26. The digital reception device of claim 17, wherein the information detector detects the information representing the characteristics of the additional data from a field sync and the signaling channel of the transport stream.

27. The digital reception device of claim 18, wherein the operation corresponding to the FEC comprises a convolutional (CV) decoding of the field sync data and a Reed Solomon (RS) decoding of the CV-decoded field sync data.

28. A method for processing a transport stream by a digital reception device, the method comprising:
   receiving, by the digital reception device, the transport stream in which normal data and additional data are mixed;
   detecting, by the digital reception device, information representing characteristics of the additional data from a signaling channel of the received transport stream; and
   processing, by the digital reception device, the transport stream using the detected information representing the characteristics of the additional data,
   wherein the additional data is error-correction encoded before being inserted into the transport stream at a transmitter of the transport stream so that the additional data is more robust than the normal data.

29. The method of claim 28, wherein the detecting of the information comprises detecting information representing characteristics of the additional data from a field sync of the received transport stream, and the detecting of the information from the field sync comprises:
   demultiplexing the field sync data in the transport stream;
   performing convolutional (CV) decoding of the detected field sync data;
   performing Reed Solomon (RS) decoding of the CV-decoded field sync data; and
   derandomizing the RS-decoded field sync data.

30. The method of claim 28, wherein the detecting of the information comprises detecting information representing characteristics of the additional data from a field sync of the received transport stream, and the detecting of the information from the field sync comprises:
   demultiplexing the field sync data in the transport stream;
   derandomizing the demultiplexed field sync data;
   performing convolutional (CV) decoding of the derandomized field sync data; and
   performing Reed Solomon (RS) decoding of the CV-decoded field sync data, so that the information representing the characteristics of the additional data in the field sync is restored.

31. The digital reception device of claim 28, wherein the processing of the data comprises:
   synchronizing the transport stream;
   equalizing the synchronized transport stream;
   performing forward error correction of the equalized transport stream; and
   detecting and restoring the additional data from the —forward error corrected transport stream based on a location identified by the restored information representing the characteristics of the additional data.

32. The method of claim 28, wherein the detecting of the information comprises:
   detecting the signaling channel from the received transport stream; and
   detecting the information representing the characteristics of the additional data from the signaling channel by processing the signaling channel.

33. The method of claim 28, further comprising:
   detecting a supplementary reference signal (SRS) from the transport stream based on the detected information representing the characteristics of the additional data.

34. The method of claim 33, wherein the information representing the characteristics of the additional data is information used to process the additional data and/or the SRS, and includes a coding rate, a data rate, an insertion position, a type of a used error correction code, primary service information, an insertion pattern of the SRS, information regarding a size of the SRS, information used to support time slicing, a description of the additional data, information regarding modification of the information representing the characteristics of the additional data, and/or information to support an Internet protocol (IP) service.

35. The method of claim 29, wherein the detecting of the information comprises combining mode signal areas formed in each of a plurality of field syncs of the transport stream.

* * * * *